United States Patent

Bruckelmyer

[11] Patent Number: 5,181,655
[45] Date of Patent: Jan. 26, 1993

[54] MOBILE HEATING SYSTEM

[76] Inventor: Mark Bruckelmyer, 5617 McQuade Rd., Duluth, Minn. 55804

[21] Appl. No.: 739,465

[22] Filed: Aug. 2, 1991

[51] Int. Cl.⁵ .............................................. E03B 7/14
[52] U.S. Cl. ..................................... 237/1 R; 165/45; 405/131; 405/258
[58] Field of Search ............... 405/131, 258; 237/1 R; 165/45

[56] References Cited

U.S. PATENT DOCUMENTS

| | | |
|---|---|---|
| 340,161 | 4/1886 | Sooysmith . |
| 879,745 | 2/1908 | Cooper . |
| 1,390,457 | 9/1921 | Moran . |
| 1,587,984 | 6/1926 | Pearce . |
| 1,704,577 | 3/1929 | Pomykala . |
| 2,617,597 | 11/1952 | Bonilla ............................ 237/1 R |
| 3,293,863 | 9/1963 | Cox et al. . |
| 3,699,685 | 10/1972 | Scott . |
| 3,762,171 | 10/1973 | Bjorheim et al. . |
| 4,094,151 | 6/1978 | Fujita et al. . |
| 4,676,695 | 6/1987 | Duthweiler . |
| 4,986,311 | 1/1991 | Mikkelson . |

Primary Examiner—Arnold Rosenthal
Attorney, Agent, or Firm—Palmatier & Sjoquist

[57] ABSTRACT

A mobile heating system for thawing frozen ground. The system includes a hot water heater, antifreeze reservoir, and pumps mounted on a mobile apparatus such as a trailer for being towed by a car or truck. A line is connectable to the heater and antifreeze reservoir and includes a plurality of elongate heater probes for being implanted in the ground, adjacent a frozen water or sewer line. Circulation of hot water through the line and probes thaw the ground. Alternatively, the probes may be used to heat building material such as bricks.

9 Claims, 3 Drawing Sheets

MOBILE HEATING SYSTEM

BACKGROUND OF THE INVENTION

The present invention relates to a heating system and, more particularly, the invention relates to a mobile heating system which is uniquely adapted for use at construction sites and/or for various ground-thawing purposes.

In the northern climates there are a great many uses for a portable or mobile heating system, particularly in the construction industry, but also in the maintenance and correction of ground-freezing problems relating to preexisting structures. A common problem in the northern climate is the problem of frozen underground water and/or sewer pipes. This problem is caused by a combination of factors; in some cases the underground pipes are laid too close to the surface, and in other cases a severe cold spell without adequate snow cover causes ground freezing to unexpected depth. One general type of solution to this problem is to obtain access into the pipe and/or conduit which is frozen, and inject heated liquid into the conduit until the frozen portion becomes dislodged of ice. Another general type of approach which has been used, particularly in the case of metal underground pipes, is to apply a very high electrical current to the metal pipe casing, thereby heating it to a temperature which causes the interior to become thawed. A third general type of solution to this problem has been to insert heating pipes into the ground itself, and thaw the ground surrounding the pipe, thereby thawing the pipe. The present invention is directed to this third type of solution, at least with respect to the problem of thawing underground pipes.

A further problem exists in connection with outdoor construction projects in cold climates. For example, construction work such as bricklaying is severely hampered in cold weather, not only because the concrete tends to be difficult to maintain in usable form, but also because the sand mixtures and the bricks themselves tend to become frozen. The optimum temperature for laying brick or block materials is in the range of 40°-45° Fahrenheit. If the temperature drops below this range, the mortar used to bond the bricks and/or blocks will not properly adhere to the materials, leading to a weakened construction. In such situations, it would be helpful to heat up the temperature of such construction materials so as to improve the overall quality and efficiency of the finished construction project. The present invention is also useful on construction projects for heating construction materials in preparation of use.

SUMMARY OF THE INVENTION

A feature of the present invention is the provision, in a heating system for thawing frozen ground, of a line and a heater for heating fluid being circulated in the line by a pump, an elongate heater probe for being implanted in the ground, and an antifreeze reservoir connectable to the line for pumping antifreeze into the line to protect the line and probe from freeze damage.

Another feature is the provision, in such a heating system, of the heater, antifreeze reservoir, and pump being mounted on a mobile apparatus.

Another feature is the provision in such a heating system, of the elongate heating probe having inner and outer concentric tubes, and the heating fluid flowing against a large surface area of the outer tube to maximize heat transfer to the probe's outer environment.

Another feature is the provision in such a heating system, of the probe being utilized with a block of building material to heat the building material during a construction process.

Another feature is the provision in such a heating system, of the probe being utilized with a pile of sand used in mixing cement.

An advantage of the present invention is that a frozen water or sewer line may be easily thawed.

Another advantage is that the line and heater probes may be retained safely in place overnight or over the weekend without freeze damage.

Another advantage is that the present heating system may be transported readily from site to site.

Another advantage is that blocks of building material may be easily warmed before being cemented into place. Attendant advantages are stronger and truer structures, as the higher temperature of the blocks improves the bonding qualities and overall qualities of the job.

Another advantage is that piles of particulate building material such as sand used in cement may be easily warmed. Thus, the sand flows more readily and is easier to handle for the worker, and may contribute to a more accurate mixing of cement.

Another advantage is that the present heating system is easy and inexpensive to manufacture, install, operate, and maintain.

DETAILED DESCRIPTION OF THE PREFERRED EMBODIMENT

Figure 1:
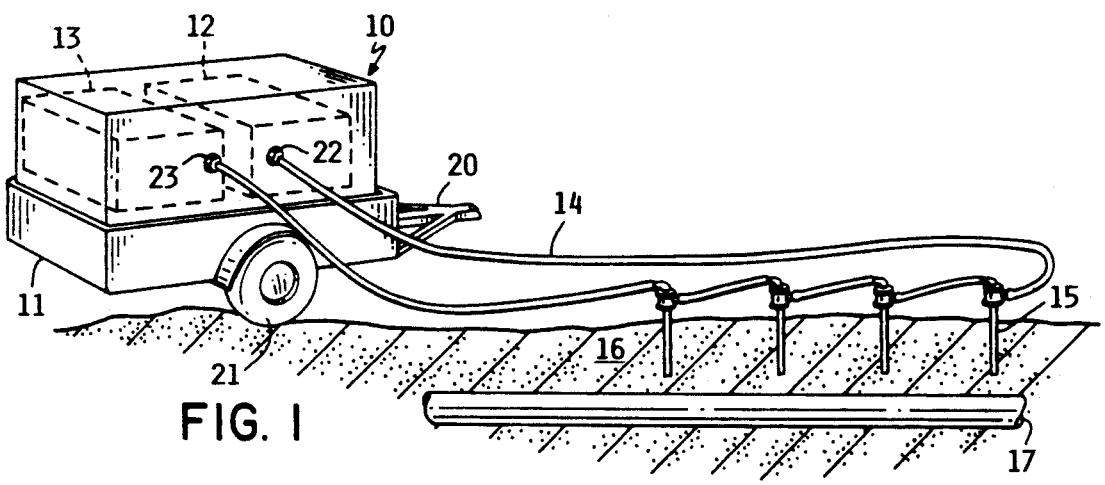
FIG. 1 is a diagrammatic view of the present heating system being utilized to thaw a frozen sewer line.

As shown in FIG. 1, the present heating system is indicated in general by the reference numeral 10 and includes as its principal components a mobile apparatus or trailer 11 with a hot water tank and heater 12 and an antifreeze reservoir 13, a fluid line 14, and elongate probes 15. Circulation of hot water from the heater 12 and through the planted probes 15 thaws a patch 16 of frozen ground and a frozen sewer or water line 17.

In more particularity with reference to FIG. 1, the trailer 11 includes a hitching frame 20 for being hitched to a car or truck, and a pair of wheels 21. Couplings 22, 23 for the line 14 lead into a valving arrangement (not shown) which in turn regulates flow of fluid to and from the hot water heater 12 and antifreeze reservoir 13.

Figure 2:
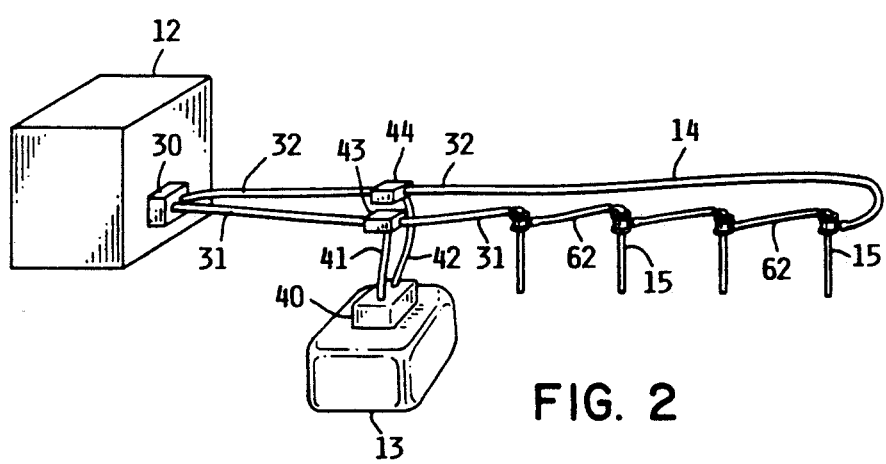
FIG. 2 is another diagrammatic view of the heating system of FIG. 1.

As shown in FIG. 2, the hot water heater 12 includes a pump 30 for pumping the hot water or heating fluid through the line 14 and probes 15. The pump 30 is in fluid communication with the hot water heater 12 and with respective inlet and outlet portions 31, 32 of the line 14.

As also shown in FIG. 2, the antifreeze reservoir 13 includes a pump 40 for pumping an antifreeze fluid into the line 14 and probes 15. The pump 40 is in fluid communication with the antifreeze reservoir 13 and with the inlet and outlet line portions 31, 32 via respective inlet and outlet reservoir line portions 41, 42 and respective valves 43, 44. Valves 43, 44 are shut relative the antifreeze reservoir 13 and open relative the hot water heater 12 when hot water is being circulated in the line 14 and probes 15. Valves 43, 44 are open relative the antifreeze reservoir 13 and shut relative the hot water heater 12 when antifreeze fluid is being pumped into the line 14 and probes 15. The antifreeze fluid that is typically utilized is ethylene glycol.

Figure 3:
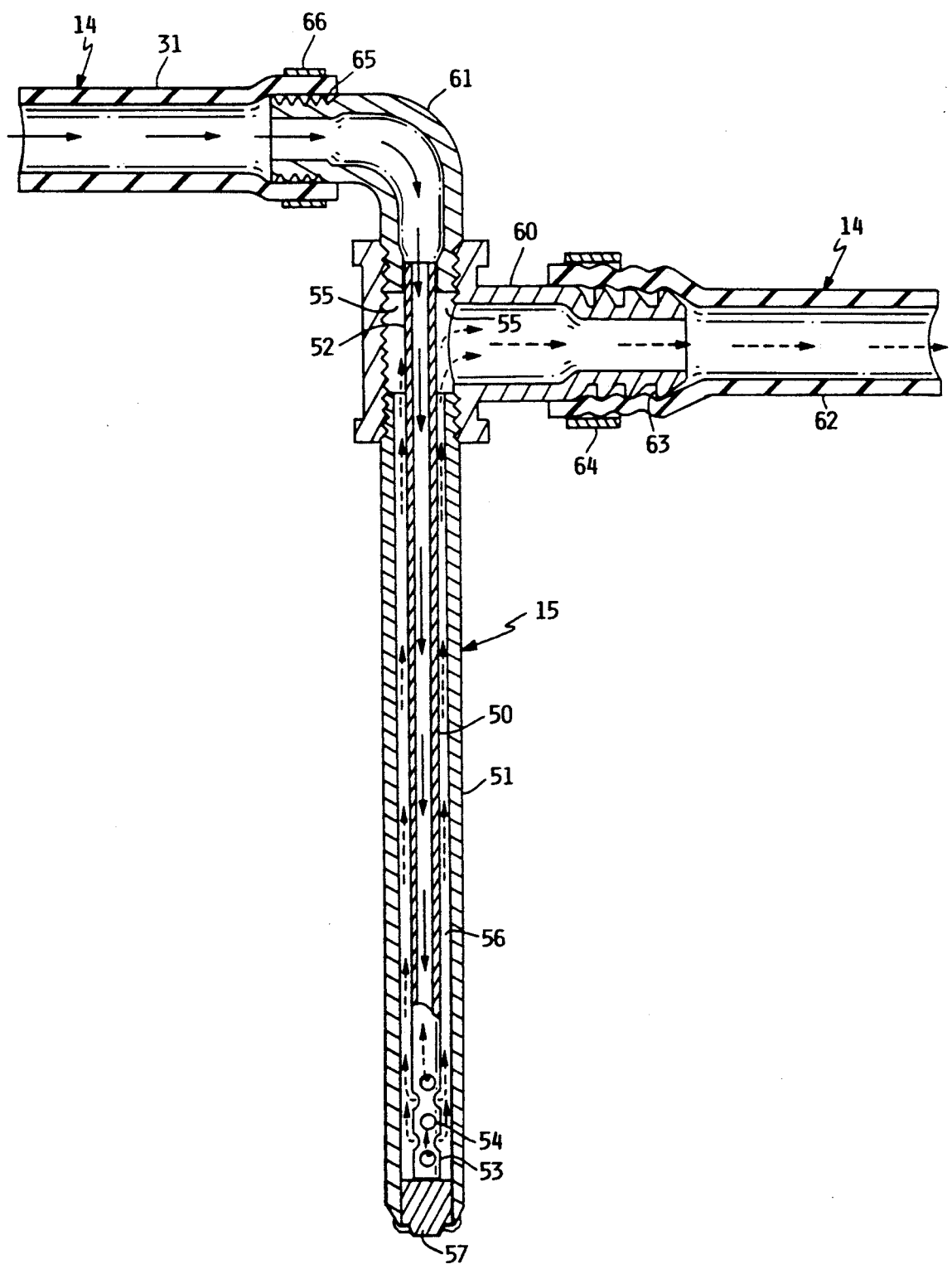
FIG. 3 is a detail section view of the elongate heating probe of the heating system of FIG. 1.

As shown in FIG. 3, the elongate heating probe 15 includes respective inner and outer concentric steel tubes 50, 51. The inner tube 50 includes a proximal inflow end 52 for receiving hot water or antifreeze fluid and a distal apertured outlet end 53 for releasing via its apertures 54 the hot water or antifreeze fluid into the volume between inner tube 50 and outer tube 51. The outer tube 51 includes an egress port 55 disposed adjacent the proximal inflow end 52 of the inner tube 50 such that the hot water and antifreeze fluid flow a sufficient distance for heat transfer in a passage 56 formed by the outside surface of inner tube 50 and the inner surface of the outer tube 51. A plug 57 is secured such as by welding adjacent to the distal end 53 of the inner tube 50 to seal the probe 15.

As also shown in FIG. 3, the outer tube 51 is threadably connectable to a tee connection 60 about the egress port 55 and proximal end 52 of the inner tube 50 for being in fluid communication with the egress port 55. The tee connection 60 is also threadably connectable to a tubular elbow connection 61 that directs hot water or antifreeze fluid from the inlet line portion 31 to the proximal end 52 of the inner tube 60. The tee connection 60 is further connectable to the outlet line portion 32 or one of a number of medial line portions 62, which are disposed between probes 15. For being connected to outlet line portion 32 or one of the medial line portions 62, the tee connection 60 may include sealing ribs 63 for pinching the line portions 32, 62 in cooperation with a band 64 engaging one of the line portions 32, 62. The elbow connection 61 also includes like sealing ribs 65 and a like band 66 for sealing engagement with inlet line portion 31 or one of the medial line portions 62.

In operation, holes are drilled into the frozen patch 16 of ground surrounding the frozen sewer or water line 17 or the probes are driven into the ground, so that the probes are into the ground a reasonable depth. Antifreeze solution is then pumped via pump 40 through the line 14 and probes 15 until the probes and lines are warmed, and then hot water is pumped therethrough. Hot water conveyed into the elbow connection 61 flows into the proximal end 52 of inner tube 50, through inner tube 50, out the apertures 54 of distal end 53, upwardly through flow passage 56, out of the egress port 55, through the connection 60, and into the medial line portion 62 to a subsequent heater probe 15. If circulation of the hot water ceases either intentionally or unintentionally such as upon a breakdown of pump 30, it is advantageous to convey antifreeze solution into the line 14 and probes 15. When pumping antifreeze fluid into line 14 and probes 15, the valves 43, 44 are shut relative the hot water heater 12 and opened relative the antifreeze reservoir 13.

It should be noted that after pumping antifreeze solution into line 14, the antifreeze fluid in the reservoir 13 may be diluted somewhat by the hot water previously present in the line 14 and probes 15 and vice versa. If such dilution is not desired, the hot water may be blown from the line 14 and probes 15 with an air compressor. Conversely, before operation of the valves 43, 44 to allow hot water flow through the line 14 and probes 15, excessive antifreeze fluid may be blown from the line 14 and probes 15 by an air compressor. The lines and probes, and the ground surface around the area to be heated may be covered with plastic or other material.

Figure 4:
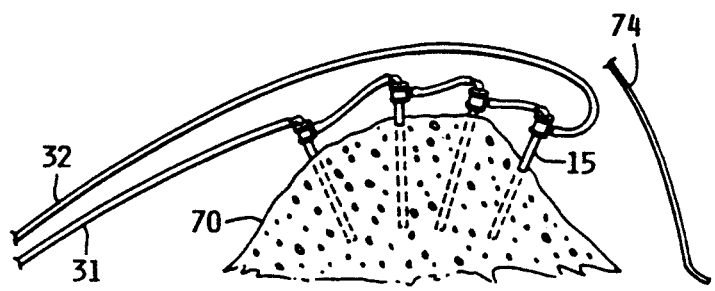
FIG. 4 is a plan, partially phantom view of the probes of FIG. 3 in a pile of sand used in the mixing of cement.
Figure 5:
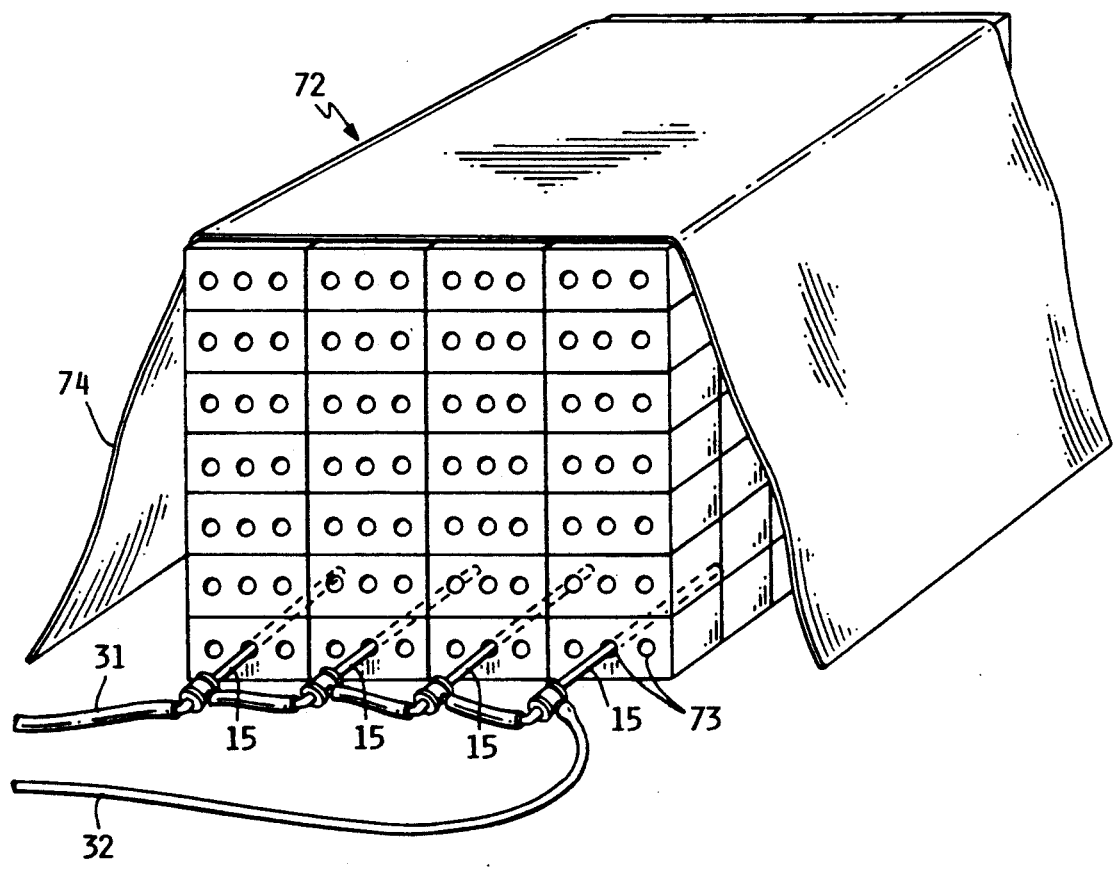
FIG. 5 is a perspective partially phantom view of the probes of FIG. 3 disposed in bricks used for construction purposes.

As shown in FIG. 4, a pile 70 of sand used in a mixing of cement may be heated by a plurality of probes 15 attached to the heating system 10 through inlet and outlet line portions 31, 32. As shown in FIG. 5, the probes 15 may also warm a pile of bricks 72. The probes 15 are inserted in the aligned apertures 73 of the bricks 72. Plastic sheeting 74 placed over the bricks 72 or sand 70 facilitates a heating of the sand 70 or bricks 72.

Of course, the number of probes 15 may be varied to accommodate any particular work site situation, by either varying the spacing between consecutively positioned probes or by varying the number of such probes used at the work site. One of the unique advantages of the invention is the ability to adapt the system to a particular work site configuration, by merely connecting and/or disconnecting the medial line portion 62, varying the respective lengths of medial line portion 62, and by inserting greater or lesser numbers of probes 15 in the series flow circuit.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. A heating system for thawing frozen ground comprising
   a) a water reservoir and fluid lines connected to the water reservoir;
   b) a first pump connectable to the lines for pumping fluid through the lines;
   c) a heater coupled to the water reservoir for heating the water;
   d) a plurality of heater probes connectable to the lines in series spaced arrangement, the heating fluid being pumped through the lines, each probe being elongate for insertion into the ground and having an inner and outer concentric tube, with the inner tube having an upper means for connecting to a line and a plurality of lower openings, and the outer tube having an upper means for connecting to the line for series flow of liquid through the inner and outer tubes;
   e) an antifreeze solution reservoir connectable to the lines for storing an antifreeze fluid for being pumped into the lines; and
   f) two-way valves connected to control flow from the water reservoir and the antifreeze solution reservoir.

2. The heating system of claim 1, wherein the heater, antifreeze reservoir, and pump are mounted on a mobile apparatus.

3. The heating system of claim 2, wherein the water reservoir includes a fluid tank for storing a supply of the heating fluid.

4. The heating system of claim 1, wherein the lines comprise inlet and outlet portions relative to the plurality of probes, each of the inlet and outlet portions connectable to said two-way valves, the valves controlling flow of water and antifreeze fluid to and from the lines and probes.

5. The heating system of claim 1, and further comprising a second pump, the first pump being in fluid communication with the antifreeze reservoir for pumping the antifreeze fluid into the line, the second pump in fluid communication with the water reservoir for circulating water through the line.

6. The heating system of claim 5, wherein the outer tube includes an egress port adjacent the proximal inflow end of the inner tube such that the fluid flows an effective distance against the outside tube for heat transfer.

7. The heating system of claim 6, wherein the outer tube is connectable to a T-shaped tubular connection, the T-shape connection being connectable to the line and being in fluid communication with the egress port.

8. The heating system of claim 7, wherein the T-shaped connection is connectable to an elbow tubular connection, the elbow connection being in fluid communication with the proximal inflow end of the inner tube.

9. A mobile heating system for thawing frozen ground and the like, comprising
   a) a mobile apparatus having means for ground transport;
   b) a hot water heater mounted on the mobile apparatus, the heater having a hot water tank for storing a supply of water;
   c) a fluid line connectable to the hot water tank;
   d) a first pump connectable to the fluid line and in fluid communication with the hot water heater for pumping water through the line, the first pump being mounted on the mobile apparatus;
   e) an antifreeze reservoir connectable to the fluid line and mounted on the mobile apparatus;
   f) a second pump connectable to the fluid line and in fluid communication with the antifreeze reservoir for pumping antifreeze through the line, the second pump being mounted on the mobile apparatus; and
   g) a plurality of spaced apart elongate heater probes connectable to the line in series flow relationship, each of the probes comprising an inner and outer concentric tube, the inner tube including a proximal inflow end for receiving fluid and a distal outflow end for releasing the fluid into the outer tube, the outer tube including an egress port adjacent the proximal inflow end of the inner tube such that the fluid flows an effective distance for heat transfer.

* * * * *